United States Patent [19]

Higaski et al.

[11] Patent Number: 4,985,630
[45] Date of Patent: * Jan. 15, 1991

[54] RADIATION IMAGE READ-OUT APPARATUS AND REPRODUCTION CONDITION DESIGNATING APPARATUS

[75] Inventors: Nobuaki Higaski; Masamitsu Ishida; Nobuyoshi Nakajima, all of Kanagawa, Japan

[73] Assignee: Fuji Photo Film Co., Ltd., Kanagawa, Japan

[*] Notice: The portion of the term of this patent subsequent to Mar. 28, 2006 has been disclaimed.

[21] Appl. No.: 171,242
[22] Filed: Mar. 18, 1988

Related U.S. Application Data

[63] Continuation of Ser. No. 774,428, Sep. 10, 1985, abandoned.

[30] Foreign Application Priority Data

Sep. 12, 1984 [JP] Japan .................. 59-192096
Sep. 13, 1984 [JP] Japan .................. 59-191326

[51] Int. Cl.$^5$ ............................................. G01N 23/04
[52] U.S. Cl. ................................................ 250/327.2
[58] Field of Search ........................ 250/327.2, 484.1

[56] References Cited

U.S. PATENT DOCUMENTS

| 3,916,192 | 10/1975 | Schmitmann et al. | 378/116 |
|---|---|---|---|
| 4,350,893 | 9/1982 | Takahashi et al. | 250/484.1 |
| 4,496,973 | 1/1985 | Horikawa et al. | 358/111 |
| 4,507,797 | 3/1985 | Kato | 378/165 |
| 4,527,060 | 7/1985 | Suzuki et al. | 250/484.1 B |
| 4,611,247 | 9/1986 | Ishida et al. | 250/327.2 |
| 4,641,242 | 2/1987 | Kimura | 250/337 |
| 4,816,680 | 3/1989 | Nakajima et al. | 250/484.1 B |

FOREIGN PATENT DOCUMENTS

| 0066008 | 10/1981 | European Pat. Off. |
| 0077999 | 10/1982 | European Pat. Off. |
| 2438856 | 9/1980 | France |
| 1600220 | 10/1981 | United Kingdom |

OTHER PUBLICATIONS

Electro Medica, vol. 49, No. 2, 1981, pp. 113-116, Erlangen, DE;: G. Breitling et al.: "Polyphos 300—ein Mittelfrequenzrontgengenerator".

Primary Examiner—Carolyn E. Fields
Attorney, Agent, or Firm—Sughrue, Mion, Zinn, Macpeak & Seas

[57] ABSTRACT

A radiation image read-out apparatus comprises a read-out device for detecting a radiation image recorded on a recording medium and generating an electric image signal, an input device for entering information concerning the image recording portion of an object and the image recording method, and a control device for adjusting read-out conditions on the basis of the information entered by the input device and feeding the adjusted read-out conditions to the read-out device. A reproduction condition designating apparatus is constituted by the input device, the control device, a device for displaying the reproduction conditions adjusted by the control device, and a correction input device for correcting the reproduction conditions displayed by the display device.

8 Claims, 2 Drawing Sheets

RADIATION IMAGE READ-OUT APPARATUS AND REPRODUCTION CONDITION DESIGNATING APPARATUS

This is a continuation of application Ser. No. 774,428 filed Sept. 10, 1985 now abandoned.

BACKGROUND OF THE INVENTION

1. Field of the Invention

This invention relates to an apparatus for reading out a radiation image. This invention particularly relates to a radiation image read-out apparatus suitable for detecting a radiation image stored in a stimulable phosphor sheet in a radiation image recording and reproducing system using the stimulable phosphor sheet and for generating an electric image signal. This invention also relates to an apparatus for designating the reproduction processing conditions, i.e. read-out conditions and/or image processing conditions, to an apparatus for reproduction processing of a radiation image, i.e. a radiation image read-out apparatus and/or an image processing apparatus for processing the electric image signal generated by the read-out apparatus.

2. Description of the Prior Art

When certain kinds of phosphors are exposed to a radiation such as X-rays, α-rays, β-rays, γ-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. No. 4,258,264 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet) is first exposed to a radiation passing through an object to have a radiation image stored therein, and is then scanned with stimulating rays such as a laser beam which cause it to emit light in the pattern of the stored image. The light emitted by the stimulable phosphor sheet upon stimulation thereof is photoelectrically detected and converted to an electric image signal, which is processed as desired to reproduce a visible image on a recording medium such as a photographic film or on a display device such as a cathode ray tube (CRT).

In the aforesaid radiation image recording and reproducing system, there is used a radiation image read-out apparatus provided with a read-out means for scanning the stimulable phosphor sheet by stimulating rays and photoelectrically detecting the light emitted by the stimulable phosphor sheet during the scanning to generate an electric image signal.

In many cases, the aforesaid radiation image recording and reproducing system is used for medical diagnosis of the human body or the like. Therefore, the radiation image recording and reproducing system is required to reproduce a visible image suitable for viewing, particularly for diagnostic purposes. In this case, the required quality conditions of the visible image, for example, the output density level, the density level range and the contrast, are different in accordance with the purpose of diagnosis.

Therefore, in order to obtain a more suitable visible image, read-out of the radiation image stored in the stimulable phosphor sheet by use of the read-out means should be conducted by using read-out conditions suitable for the purpose of diagnosis so that an electric image signal which generates a visible image suitable for the diagnostic purpose is obtained.

Also, before the electric image signal generated by the read-out means is used to reproduce a visible image, it is normally subjected to a signal processing such as a gradation processing or a frequency response processing by an image processing means in order to obtain a visible image suitable for diagnostic purpose. In this case also, since the image processing conducted by the image processing means is extremely complicated, the electric image signal should desirably be sent in a pre-processed condition to the image processing means so that the image processing of the type suitable for the particular diagnostic purpose may be achieved easily. Also in order to feed such a pre-processed electric image signal to the image processing means, read-out by the read-out means should be conducted by use of the read-out conditions most suitable for the respective diagnostic purpose

SUMMARY OF THE INVENTION

The primary object of the present invention is to provide a radiation image read-out apparatus wherein image read-out is conducted by use of read-out conditions suitable for respective diagnostic purposes in order to obtain a visible image suitable for the diagnostic purposes or to facilitate the image processing conducted therefor by the image processing means.

Another object of the present invention is to provide an apparatus for designating the reproduction processing conditions for a radiation image, wherein reproduction processing conditions adjusted on the basis of information on the image recording portion and the image recording method may be confirmed and changed easily.

The present invention provides a radiation image read-out apparatus provided with a read-out means for detecting a radiation image recorded on a recording medium and generating an electric image signal, wherein the improvement comprises the provision of an input means for entering information concerning an image recording portion of an object and an image recording method, and a control means for adjusting read-out conditions on the basis of the information entered by said input means and feeding the adjusted read-out conditions to said read-out means.

The present invention also provides an apparatus for designating the reproduction processing conditions for a radiation image, which is provided with an input means for entering information concerning an image recording portion and an image recording method, and a control means for adjusting reproduction processing conditions for a radiation image on the basis of the information entered by said input means and designating said reproduction processing conditions to a radiation image reproduction processing apparatus, wherein the improvement comprises the provision of a display means for displaying a part or all of the reproduction processing conditions adjusted by said control means, and a correction input means for correcting the reproduction processing conditions displayed by said display means.

The radiation image read-out apparatus of the present invention is constituted so that read-out conditions are adjusted on the basis of the information on the image recording portion and the image recording method, and image read-out is conducted by use of the adjusted read-out conditions. Practically, from various kinds of data obtained through the past read-out, it is possible to know the standard image adequate for diagnosing each image recording portion or for the case where the image of a predetermined object portion is recorded by a predetermined image recording method for a special viewing purpose. Therefore, when the image recording portion and the image recording method are known, it becomes possible to accurately judge the required quality of the visible image suitable for viewing, particularly for diagnostic purposes, in each image recording.

That is, since the radiation image read-out apparatus of the present invention is constituted so that image read-out is conducted by use of the read-out conditions adjusted on the basis of the information on the image recording portion and the image recording method corresponding to the viewing purposes, it is possible to generate an electric image signal in the condition capable of reproducing a visible image suitable for viewing, particularly for diagnostic purposes, or in a condition capable of facilitating the image processing conducted for obtaining a visible image suitable for viewing, particularly for diagnostic purposes.

The apparatus for designating the reproduction processing conditions for a radiation image in accordance with the present invention is provided with a display means for displaying a part or all of the read-out conditions and/or the image processing conditions adjusted by the control means, and a correction input means for correcting the conditions displayed by the display means. Therefore, it is possible to confirm or change easily the adjusted read-out conditions and/or the image processing conditions. For example, when the image recording is special and the read-out conditions and/or the image processing conditions suitable for the image recording are different from the standard optimum read-out conditions and/or image processing conditions, it is possible to easily correct the standard optimum conditions to values suitable for the special image recording. Accordingly, it becomes possible to obtain a visible image suitable for viewing, particularly for diagnostic purposes.

By the image recording portion is meant the portion of an object the image of which is recorded, for example, the head, the chest, or the abdomen when the object is the human, or the whole head, the eyeball, the nose, or the ear as the sub-classification of the head, or the front portion or the side portion of the head.

By the image recording method is meant the manner in which the object image is recorded, for example, normal image recording, contrasted image recording, or enlargement image recording.

The image recording portion and the image recording method embrace all of the parameters concerning image recording wherein the optimum read-out conditions change with changes in the image recording. However, the input means for entering the information on the image recording portion and the image recording method need not necessarily be of the type capable of entering all of the parameters, but may be of the type capable of entering some appropriately selected parameters.

By the read-out conditions are meant various conditions affecting the relationship between the input and the output of the read-out means for detecting the radiation image recorded on the recording medium and generating the electric image signal, for example, the read-out gain, the scale factor, and the power of the stimulating rays used for read-out.

The term "adjusting the read-out conditions on the basis of the information on the image recording portion and the image recording method" embraces not only the case where the read-out conditions are adjusted on the basis of only the information on the image recording portion and the image recording method, but also the case where information on other items are considered in the adjustment of the read-out conditions.

By the term "reproduction processing conditions for a radiation image" are meant the aforesaid read-out conditions and/or image processing conditions used when the electric image signal generated by the image read-out is processed. By the image processing conditions are meant various conditions affecting the relationship between the input and the output of an image processing apparatus for processing the electric image signal fed by the read-out apparatus, for example, gradation processing conditions, frequency response enhancement processing conditions, and whether to invert the image or not.

By the radiation image reproduction processing apparatus is meant the read-out apparatus and/or the image processing apparatus.

The read-out conditions also embrace a read-out mode in which one or more of the read-out gain, the scale factor or the like are adjusted.

DESCRIPTION OF THE PREFERRED
EMBODIMENTS

The present invention will hereinbelow be described in further detail with reference to the accompanying drawings.

Figure 1:
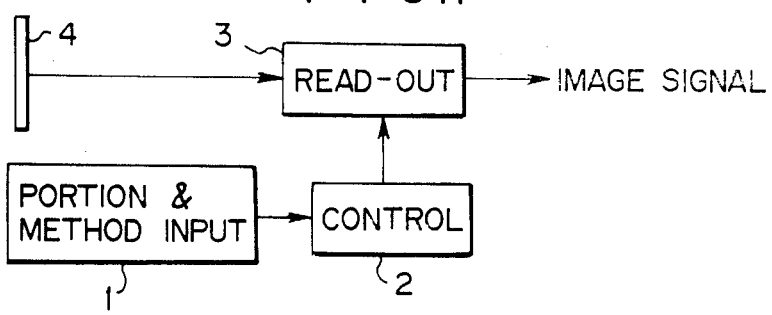
FIG. 1 is a block diagram showing an embodiment of the radiation image read-out apparatus in accordance with the present invention.

FIG. 1 shows an embodiment of the radiation image read-out apparatus in accordance with the present invention. The apparatus is provided with an input means 1 for entering the information concerning the image recording portion and the image recording method, and a control means 2 for adjusting the read-out conditions on the basis of the information entered by the input means 1 and feeding the read-out conditions to a read-out means 3.

Figure 2:
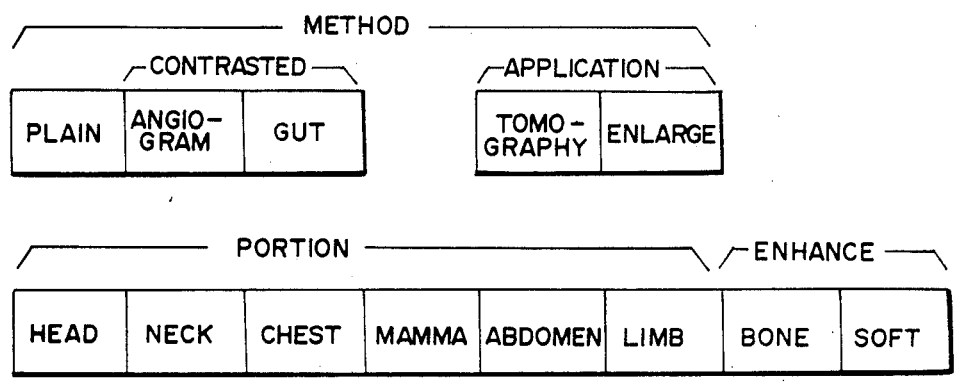
FIG. 2 is a schematic view showing an example of key arrangement on a console constituting the input means shown in FIG. 1.

The input means 1 comprises a console provided with keys arranged, for example, as shown in FIG. 2. For example, in the case of plain image recording for the head, the information specifying the plain image recording for the head is entered to the control means 2 by pressing a "head" key and a "plain" key. The kinds of the image recording portion and the image recording method which should be entered as the information or the manner in which the information is entered may be selected arbitrarily. Adjustment of the read-out conditions by the control means 2 may be conducted on the basis of not only the information on the image recording portion and the image recording method but also other information, for example, information obtained by preliminary read-out for approximately ascertaining the radiation image recorded on the recording medium prior to final read-out for detecting an electric image signal used for reproduction of a visible image as described, for example, in Japanese Unexamined Patent Publication No. 58(1983)-67240, and information desired for the visible image in accordance with viewing purposes, particularly diagnostic purposes. The input means 1 may be constructed also to enter the aforesaid other information to the control means 2. For example, as shown in FIG. 2, the input means 1 may be constructed to enter not only the information on the image recording portion and the image recording method but also the information on bone image enhancement and soft tissue image enhancement as the aforesaid information desired for the visible image.

The control means 2 adjusts the read-out conditions on the basis of the information on the image recording portion and the image recording method and optionally by considering other information, for example, the information obtained by preliminary read-out and the information desired for the visible image. The control means 2 may be provided with a storage means (not shown) so that various information items (information entered by various means to the control means 2) which should be considered in adjustment of the read-out conditions such as the information on the image recording portion and the image recording method and other information are stored in advance and are used when necessary to adjust the read-out conditions.

Adjustment of the read-out conditions by the control means 2 may be conducted, for example, by storing in advance the data on read-out conditions suitable for combinations of the image recording portions with the image recording methods and selecting the optimum read-out conditions from the stored data when the image recording portion and the image recording method are entered by the input means 1, or by calculating on the basis of the image recording portion and the image recording method entered by the input means 1. When the information other than the information on the image recording portion and the image recording method is also entered to the control means 2, the read-out conditions may be adjusted by use of also the data stored in consideration of the other information or by calculating in consideration of also the other information.

Figure 3:
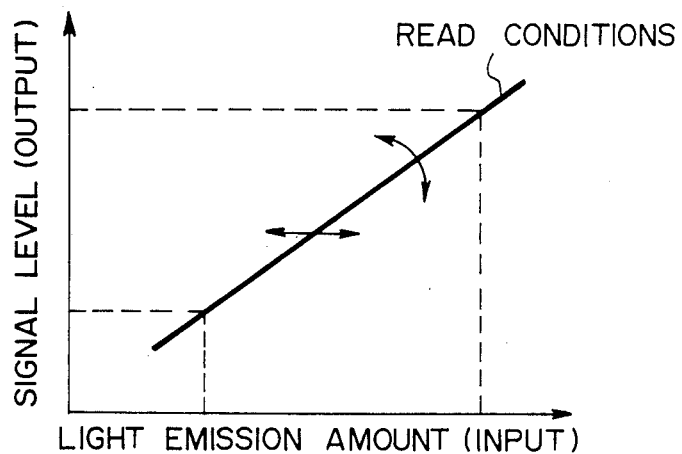
FIG. 3 is a graph showing an example of the read-out conditions.

When the read-out conditions are adjusted, all of the read-out conditions need not necessarily be adjusted on the basis of the entered information on the image recording portion and the image recording method, and only some of the read-out conditions, for example, only the read-out gain and the scale factor, may be adjusted. The read-out gain is a parameter representing the transverse position of the line indicating the read-out conditions in FIG. 3, and defines the level of the output signal (electric image signal) generated by a predetermined level of the input signal which is fed to the read-out means, for example, the input signal representing a predetermined amount of light emitted by a stimulable phosphor sheet when it is exposed to stimulating rays. The scale factor is a parameter representing the inclination of the line indicating the read-out conditions in FIG. 3, and defines the relationship between the size of the level range of the input signal fed to the read-out means and the size of the level range of the output signal.

The read-out means 3 detects a radiation image recorded on recording medium 4 such as a stimulable phosphor sheet and generates an electric image signal. For example, the read-out means 3 comprises a stimulating ray source, a scanning means such as a galvanometer mirror for scanning the stimulable phosphor sheet by stimulating rays emitted by the stimulating ray source, and a photodetector for photoelectrically detecting light emitted by the stimulable phosphor sheet upon exposure to stimulating rays and generating an electric image signal. Image read-out by the read-out means 3 is conducted by use of the read-out conditions adjusted by the control means 2.

The radiation image read-out apparatus of the present invention is also applicable to read-out of a radiation image recorded on a recording medium other than the stimulable phosphor sheet.

Figure 4:
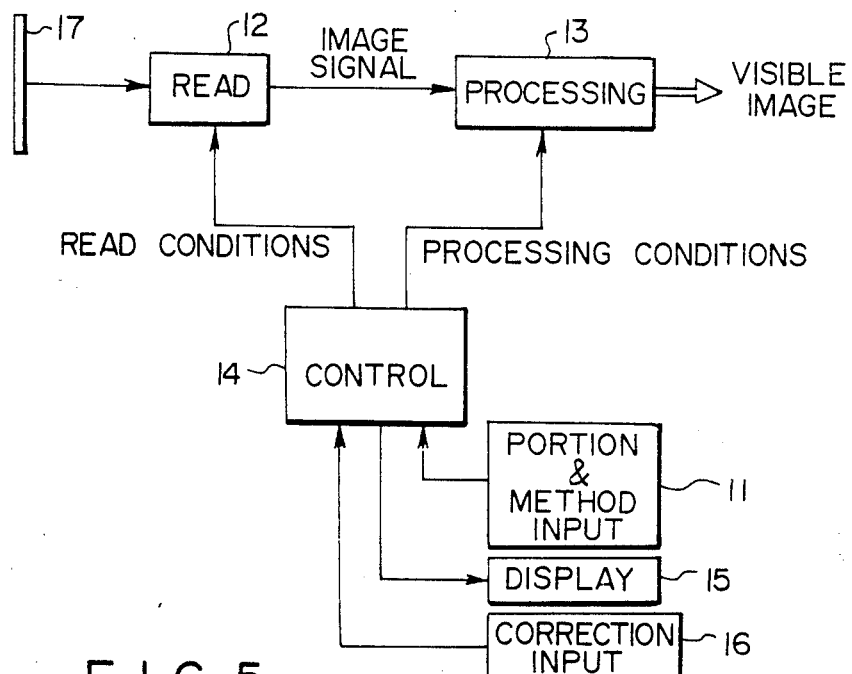
FIG. 4 is a block diagram showing an embodiment of the apparatus for designating the reproduction processing conditions for a radiation image in accordance with the present invention.

FIG. 4 shows an embodiment of the apparatus for designating the reproduction processing conditions for a radiation image in accordance with the present invention. The apparatus is provided with an input means 11 for entering the information concerning the image recording portion and the image recording method, and a control means 14 for adjusting the read-out conditions and/or the image processing conditions at least on the basis of the information on the image recording portion and the image recording method entered by the input means 11 and designating the adjusted conditions to a read-out apparatus 12 or an image processing apparatus 13. The apparatus for designating the reproduction processing conditions for a radiation image is also provided with a display means 15 for displaying a part or all of the read-out conditions and/or the image processing conditions adjusted by the control means 14, and a correction input means 16 for correcting the read-out conditions and/or the image processing conditions displayed by the display means 15.

Figure 5:
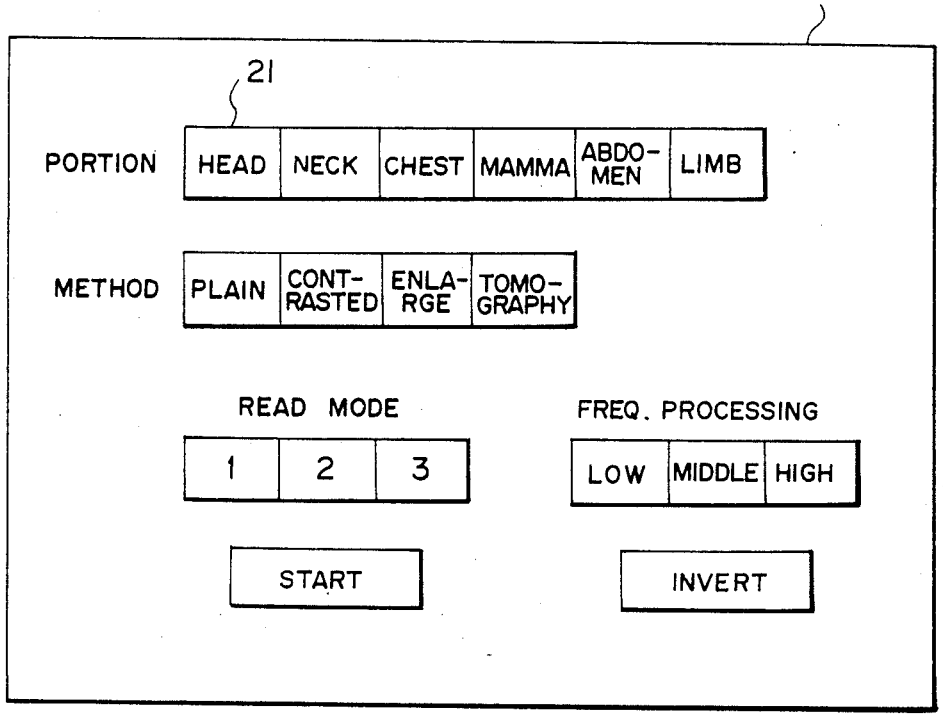
FIG. 5 is a front view showing a console box integrating the input means, the display means and the correction input means of FIG. 4.

FIG. 5 is a front view showing a console box 20 incorporating the input means 11, the display means 15 and the correction input means 16, and provided with many switches 21 with built-in lamps. The input means 11 comprises a plurality of switches corresponding to the image recording portions such as the head and the neck, and a plurality of switches corresponding to the image recording methods such as plain image recording and contrasted image recording.

The control means 14 stores in advance the data on the read-out conditions and the image processing conditions suitable for combinations of the image recording portions and the image recording methods, and selects optimum read-out conditions and the optimum image processing conditions from the stored data in accordance with the image recording portion and the image recording method entered by the input means 11. The control means 14 also designates the selected conditions to the read-out apparatus 12 and the image processing apparatus 13. Of course, the control means 14 adjusts the optimum read-out conditions and/or the optimum image processing conditions by calculation based on the information on the image recording portion and the image recording method entered by the input means 11.

The display means 15 comprises three switches with built-in lamps corresponding to read-out modes 1, 2 and 3 and for displaying the adjusted read-out conditions, three switches with built-in lamps corresponding to frequency response processing ranks (low, middle, high) and for displaying the adjusted image processing conditions, and a switch with a built-in lamp for designating whether to conduct image inversion or not. The display means 15 is used also as the correction input means 16.

The display means 15 may be constructed to indicate all of the read-out conditions and the image processing conditions adjusted by the control means 14, i.e. all of the parameters of the adjusted conditions. However, actually, it is sufficient that only the major parameters or only the parameters that are likely to be or required to be corrected by the correction input means 16 are displayed by the display means 15.

In this embodiment, the read-out conditions are classified into three modes, and the mode selected for conducting the image read-out is indicated by the lamp of the switch. In the mode 1, the read-out gain and the scale factor are adjusted by considering also the information obtained by preliminary read-out. In the mode 2, the scale factor is adjusted on the basis of only the image recording portion and the image recording method, and the read-out gain is adjusted by considering also the information obtained by preliminary read-out. In the mode 3, the read-out gain and the scale factor are adjusted on the basis of only the image recording portion and the image recording method. Of course, the readout conditions may be classified into more modes, and each mode may be defined for a different manner of read-out. Also, values of the read-out gain and the scale factor may be displayed together with the mode or instead of the mode.

As the image processing conditions, the rank of the frequency response processing and image inversion are indicated by the lamps of the switches. However, gradation processing conditions may also be displayed, and different conditions may be displayed in different manners.

The correction input means 16 is fabricated integrally with the display means 15, and the switches with built-in lamps constituting the display means 5 constitute the correction input means 16. Therefore, when the read-out mode selected by the control means 14 is the mode 1, the rank of the frequency response processing is low, and the image inversion is off, these conditions may be changed to the read-out mode 2, middle rank of the frequency response processing and image inversion on by pressing the corresponding switches.

When the conditions displayed by the display means 15 and/or the manner of displaying are different, the correction input means 16 may be modified. For example, when values of the read-out gain and the scale factor are displayed by the display means 15 and should be corrected, the display means 15 and the correction input means 16 may be constituted by a CRT and a keyboard for direct key input or a keyboard with numeric keys.

When the conditions displayed by the display means need not be corrected, the displayed (adjusted) conditions are designated to the read-out apparatus 12 and/or the image processing apparatus 13 by pressing of a start switch shown in FIG. 5. When the displayed conditions are corrected, the corrected conditions are designated to the read-out apparatus 12 and/or the image processing apparatus 13 by pressing of the start switch after completion of the correcting operation. The read-out apparatus 12 detects the radiation image recorded on a stimulable phosphor sheet 17 and generates an electric image signal by use of the designated read-out conditions, and the image processing apparatus 13 processes the electric image signal by use of the designated image processing conditions.

The apparatus for designating the reproduction processing conditions for a radiation image in accordance with the present invention is also applicable to the case where a recording medium other than the stimulable phosphor sheet is used.

We claim:

1. A radiation image read-out apparatus comprising:
   read-out means for detecting a radiation image recorded on a recording medium and generating an electric image signal,
   input means for entering information concerning an image recording portion of an object and an image recording method, and
   control means for selecting read-out conditions which are derived in a predetermined manner for various portions of said object and for a plurality of image recording methods on the basis of the information entered by said input means, and for feeding the selected read-out conditions to said read-out means.

2. An apparatus as defined in claim 1 wherein said input means comprises a console provided with keys.

3. An apparatus as defined in claim 1 wherein said read-out conditions are a read-out gain and a scale factor.

4. An apparatus as defined in claim 1 wherein said read-out means detects a radiation image recorded on a stimulable phosphor sheet.

5. An apparatus as defined in claim 4 wherein said read-out means comprises a source for emitting stimulating rays which cause the stimulable phosphor sheet to emit light in proportion to the radiation energy stored therein, a scanning means for scanning the stimulable phosphor sheet by the stimulating rays, and a photodetector for detecting the light emitted by the stimulable phosphor sheet and generating an electric image signal.

6. An apparatus for designating image read-out conditions for a radiation image, comprising:
   input means for entering information concerning an image recording portion and an image recording method,
   control means for selecting said image read-out conditions for a radiation image, said image read-out conditions being derived in a predetermined fashion on the basis of the information entered by said input means, said control means designating said image read-out conditions to a radiation image reproduction processing apparatus,
   display means for displaying a part or all of the image read-out conditions selected by said control means, and
   correction input means for correcting the image read-out conditions displayed by said display means.

7. An apparatus as defined in claim 6 wherein said input means, said display means and said correction input means are integrated with each other and form a console provided with switches having built-in lamps.

8. An apparatus as defined in claim 6 wherein said apparatus also designates image processing conditions, said control means selecting said image processing conditions in addition to said image read-out conditions, and designating said image processing conditions to said radiation image reproduction processing apparatus, said display means displaying a part or all of said image processing conditions, and said correction input means correcting said image processing conditions displayed by said display means.

* * * * *

UNITED STATES PATENT AND TRADEMARK OFFICE
CERTIFICATE OF CORRECTION

PATENT NO. : 4,985,630

DATED : January 15, 1991

INVENTOR(S) : Nobuaki Higaski et al.

It is certified that error appears in the above-identified patent and that said Letters Patent is hereby corrected as shown below:

Title page at, item [19], delete "Higaski" and insert --Higashi--;

at [75], delete "Higaski" and insert --Higashi--;

at [30], delete
"Sep. 12 1984 [JP]   Japan...........59-192096
 Sep. 13, 1984 [JP]  Japan...........59-191326"

and insert

--Sep. 12 1984 [JP]   Japan...........59-191326
  Sep. 13, 1984 [JP]  Japan...........59-192096--

Signed and Sealed this

Twenty-eighth Day of July, 1992

*Attest:*

DOUGLAS B. COMER

*Attesting Officer*      *Acting Commissioner of Patents and Trademarks*